United States Patent
Meka et al.

(10) Patent No.: US 9,453,093 B2
(45) Date of Patent: *Sep. 27, 2016

(54) BROAD MOLECULAR WEIGHT DISTRIBUTION POLYPROPYLENE RESINS

(71) Applicant: ExxonMobil Chemical Patents Inc., Baytown, TX (US)

(72) Inventors: Prasadarao Meka, Seabrook, TX (US); Saifudin M. Abubakar, Singapore (SG); Yumin Chen, Shanghai (CN); Todd S. Edwards, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/434,825

(22) PCT Filed: Oct. 8, 2013

(86) PCT No.: PCT/US2013/063765
§ 371 (c)(1),
(2) Date: Apr. 10, 2015

(87) PCT Pub. No.: WO2014/070386
PCT Pub. Date: May 8, 2014

(65) Prior Publication Data
US 2015/0252127 A1    Sep. 10, 2015

Related U.S. Application Data

(60) Provisional application No. 61/720,617, filed on Oct. 31, 2012.

(30) Foreign Application Priority Data

Jan. 23, 2013 (EP) ..................... 13152302

(51) Int. Cl.
*C08F 210/06* (2006.01)
*C08L 23/14* (2006.01)
(Continued)

(52) U.S. Cl.
CPC ............. *C08F 210/06* (2013.01); *C08F 10/06* (2013.01); *C08F 110/06* (2013.01); *C08K 3/34* (2013.01); *C08K 3/36* (2013.01); *C08L 23/14* (2013.01); *C08L 91/06* (2013.01); *H01B 1/20* (2013.01)

(58) Field of Classification Search
CPC .... C08F 110/06; C08F 10/06; C08F 210/06; C08F 2500/11; C08F 2500/04; C08L 23/10; C08L 23/12; C08L 23/14; C08L 23/16
See application file for complete search history.

(56) References Cited

U.S. PATENT DOCUMENTS

| 5,652,303 A | 7/1997 | Ishimaru et al. |
| 5,752,362 A | 5/1998 | Eichbauer |

(Continued)

FOREIGN PATENT DOCUMENTS

| CN | 102159638 | 8/2011 |
| CN | 102597096 | 7/2012 |

(Continued)

*Primary Examiner* — Rip A Lee
(74) *Attorney, Agent, or Firm* — Chad A. Guice (57) ABSTRACT

Polypropylene resin comprising at least 50 mol % propylene, an MWD (Mw/Mn) of greater than 5, a branching index (g') of at least 0.95, and a melt strength of at least 20 cN determined using an extensional rheometer at 190° C. A catalyst system comprising a Ziegler-Natta catalyst comprising a non-aromatic internal electron donor, and first and second external electron donors comprising different organosilicon compounds, and a method to produce a polypropylene resin comprising contacting propylene monomers at propylene polymerization conditions with the catalyst system are also disclosed.

14 Claims, 2 Drawing Sheets g' Long Chain Branching of Polypropylene Resin (51) Int. Cl.
*C08F 110/06* (2006.01)
*C08F 10/06* (2006.01)
*C08K 3/34* (2006.01)
*C08K 3/36* (2006.01)
*C08L 91/06* (2006.01)
*H01B 1/20* (2006.01)

(56) References Cited

U.S. PATENT DOCUMENTS

| | | | |
|---|---|---|---|
| 5,907,942 A | 6/1999 | Eichbauer | |
| 6,087,459 A | 7/2000 | Miro et al. | |
| 6,350,828 B1 | 2/2002 | Takaoka et al. | |
| 6,602,598 B1 | 8/2003 | Simpson et al. | |
| 6,723,795 B1 | 4/2004 | Dupire et al. | |
| 7,772,346 B2 | 8/2010 | Meesters et al. | |
| 7,807,769 B2 | 10/2010 | Mehta et al. | |
| 9,068,030 B2 * | 6/2015 | Song | C08F 110/06 |
| 2003/0088022 A1 | 5/2003 | Lin et al. | |
| 2003/0118853 A1 | 6/2003 | Cook et al. | |
| 2005/0159564 A1 | 7/2005 | Huovinen et al. | |
| 2007/0054997 A1 | 3/2007 | Pierini et al. | |
| 2008/0311368 A1 | 12/2008 | Tukachinsky | |
| 2009/0030098 A1 | 1/2009 | Cagnani et al. | |
| 2010/0227987 A1 | 9/2010 | Ito et al. | |
| 2011/0200775 A1 | 8/2011 | Bernreitner et al. | |
| 2012/0270039 A1 | 10/2012 | Tynys et al. | |

FOREIGN PATENT DOCUMENTS

| | | | |
|---|---|---|---|
| EP | 0 743 380 | 11/1996 | |
| EP | 0 757 069 | 2/1997 | |
| EP | 1 170 305 | 1/2002 | |
| EP | 1 882 703 | 1/2008 | |
| EP | 2 000 504 | 12/2008 | |
| EP | 2 527 376 | 11/2012 | |
| KR | 2010-0101363 | 9/2010 | |
| WO | WO 98/44011 | 10/1998 | |
| WO | WO 00/63261 | 10/2000 | |
| WO | WO 01/57099 | 8/2001 | |
| WO | WO 2007/130277 | 11/2007 | |
| WO | 2009/007265 | 1/2009 | |
| WO | WO 2010/034461 | 4/2010 | |
| WO | 2010/089123 | 8/2010 | |
| WO | WO 2011/088754 A1 * | 7/2011 | C08F 10/06 |
| WO | 2011/141070 | 11/2011 | |
| WO | 2012/049690 | 4/2012 | |
| WO | 2012/150019 | 11/2012 | |
| WO | WO2014/016205 | 1/2014 | |

* cited by examiner

Figure 1 g' Long Chain Branching of Polypropylene Resin

Figure 2
COMPLEX VISCOSITY OF PROPYLENE RESINS

BROAD MOLECULAR WEIGHT DISTRIBUTION POLYPROPYLENE RESINS

CROSS-REFERENCE TO RELATED APPLICATIONS

This application is a National Stage Application of International Application No. PCT/US2013/063765 filed Oct. 8, 2013, which claims the benefit of U.S. Provisional Application No. 61/720,617, filed Oct. 31, 2012, and European Application No. 13152302.9 filed Jan. 23, 2013, the disclosures of which are fully incorporated herein by their reference.

FIELD OF INVENTION

Polypropylene resins and articles made therefrom.

BACKGROUND

The physical properties of homopolymers of propylene formed by typical Ziegler-Natta polymerization are highly dependent on the stereoregularity of the polymer itself. Highly stereoregular polymers are generally crystalline, provide desirable high flexural moduli, and are formed with a suitable choice of an electron donor. These highly crystalline polymers also display high melting points, but innately exhibit low melt flow rates (MFR) that render them generally unsuitable for applications that require high processing rates, such as in injection molding, oriented films and thermobond fibers. Further, conventional polypropylene homopolymer and copolymer products formed from highly crystalline polypropylenes lack sufficient impact resistance for many uses.

The polypropylene homopolymer or impact copolymer resins made from the traditional Ziegler-Natta catalyst based on phthalate or other aromatic containing internal electron donor systems, and a silane or diethers external electron donor, result in a molecular weight distribution (MWD) in the range of 3 to 4.5 and as such, have very low melt strength with no evidence of strain hardening under elongational extension in the melt. The resins with molecular weight distribution in the range of 3 to 4.5 are not suitable in converting processes such as blown film applications either in mono-layer or multi-layer applications due to poor melt strength. Similar behavior is observed in sheeting, deep-drawn thermoforming, and foaming applications. Other converting applications requiring good melt strength for which such polymers are not suitable include profile extrusion, base stock for thermoplastic vulcanizates (TPV), bi-axially oriented polypropylene (BOPP) film, blow molding applications, and the like.

There is a need in the art for polypropylene resins having one or more properties, such as improved melt strength, improved stiffness, and the like. There is also a need for such polypropylene resins suitable for use in blown film, in multi-layer applications as replacement for HDPE, sheeting, thermoforming in shallow drawn and deep drawn applications, and/or foaming applications.

Related references include EP 0 757 069 A1; EP 2 000 504 A1; US 2003-088022; US 2007-054997; US 2008-311368; U.S. Pat. No. 6,602,598; U.S. Pat. No. 5,907,942; US 2003-118853; U.S. Pat. No. 5,752,362; WO 2007/130277; WO 98/44011; and WO 2010/034461

SUMMARY

In embodiments, according to the instant disclosure, a polypropylene resin comprises at least 50 mol % propylene, a MWD (Mw/Mn) of greater than 5, a branching index (g') of at least 0.95, and a melt strength of at least 20 cN determined using an extensional rheometer at 190° C.

In embodiments, a catalyst system comprises a Ziegler-Natta catalyst comprising a non-aromatic internal electron donor and first and second external electron donors comprising different organosilicon compounds.

In embodiments, a method to produce a polypropylene resin comprises contacting propylene monomers at propylene polymerization conditions with a catalyst system comprising a Ziegler-Natta catalyst comprising a non-aromatic internal electron donor and first and second external electron donors comprising different organosilicon compounds.

This summary is provided to introduce a selection of concepts that are further described below in the detailed description. This summary is not intended to identify key or essential features of the claimed subject matter, nor is it intended to be used as an aid in limiting the scope of the claimed subject matter. Other and further objects, advantages and features of the present invention will be understood by reference to claims which follow this specification.

DETAILED DESCRIPTION

In situ polymerized materials (e.g., polypropylene) with improved melt strength, MWD, and high MFRs can be produced in a single stage polymerization conducted in the presence of certain Ziegler-Natta catalysts, which may optionally be supported, a non-aromatic internal electron donor, and a blend of two external electron donors. In any embodiment, a polypropylene resin may comprise: at least 50 mol % propylene, a melt strength of at least 20 cN or at least 50 cN determined using an extensional rheometer at 190° C., a branching index (g') of at least 0.95, and an MWD (Mw/Mn) of greater than 5. In any embodiment, a Ziegler-Natta catalyst system may comprise a Ziegler-Natta catalyst comprising a non-aromatic internal electron donor, and first and second external electron donors comprising different organosilicon compounds. In any embodiment, a method for making a polypropylene resin may comprise contacting propylene monomers at a temperature and a pressure or other appropriate propylene polymerization conditions in the presence of the catalyst system to produce a polypropylene resin comprising at least 50 mol % propylene and a melt strength of at least 20 cN determined using an extensional rheometer at 190° C. In any embodiment, the catalyst system may comprise a Ziegler-Natta catalyst comprising a non-aromatic internal electron donor and a first external electron donor having the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms. In any embodiment, the catalyst system further may comprise a second external electron donor having the formula $R^3_nSi(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor.

DEFINITIONS

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition, two or more such hydrocarbyl radicals may together form a fused ring system, including partially or fully hydrogenated fused ring systems, which may include heterocyclic radicals.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which may also be referred to as a methyl functional group, ethyl alcohol is an ethyl group, which is the base structure, substituted with an —OH functional group, and pyridine is a phenyl group having a carbon in the base structure of the benzene ring substituted with a nitrogen atom.

For purposes herein, unless otherwise stated, a hydrocarbyl radical may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

For purposes herein, unless otherwise stated, hydrocarbyl radicals may also include isomers of saturated, partially unsaturated and aromatic cyclic structures wherein the radical may additionally be subjected to the types of substitutions described above. The term "aryl", "aryl radical", and/or "aryl group" refers to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

For purposes herein the term "non-aromatic" refers to compounds, radicals, and/or functional groups without aromatic character attributed to cyclic conjugated $sp^2$ carbons having protons with a chemical shift relative to TMS consistent with aromatic protons, or greater than 6, as readily understood by one of minimal skill in the art.

It is to be understood that for purposes herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Likewise the terms "functional group", "group" and "substituent" are also used interchangeably throughout this document unless otherwise specified. For purposes herein, a functional group includes both organic and inorganic radicals or moieties comprising elements from Groups 13, 14, 15, 16, and 17 of the periodic table of elements. Suitable functional groups may include hydrocarbyl radicals, e.g., alkyl radicals, alkene radicals, aryl radicals, and/or halogen (Cl, Br, I, F), O, S, Se, Te, $NR^*_x$, $OR^*$, $SeR^*$, $TeR^*$, $PR^*_x$, $AsR^*_x$, $SbR^*_x$, $SR^*$, $BR^*_x$, $SiR^*_x$, $GeR^*_x$, $SnR^*_x$, $PbR^*_x$, and/or the like, wherein R is a $C_1$ to $C_{20}$ hydrocarbyl as defined above, and wherein x is the appropriate integer to provide an electron neutral moiety. Other examples of functional groups include those typically referred to as amines, imides, amides, ethers, alcohols (hydroxides), sulfides, sulfates, phosphides, halides, phosphonates, alkoxides, esters, carboxylates, aldehydes, and the like.

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso, and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

For purposes herein, a supported catalyst and/or activator refers to a catalyst compound, an activator, or a combination thereof located on, in, or in communication with a support wherein the activator, the catalyst compound, or a combination thereof are deposited on, vaporized with, bonded to, incorporated within, adsorbed or absorbed in, adsorbed or absorbed on, the support.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this disclosure, the term "α-olefin" includes $C_2$ to $C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst" and "catalyst compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator, an internal electron donor, one or more external electron donors, and/or a co-catalyst to initiate catalysis. When the catalyst compound is combined with electron donors and/or co-catalysts to initiate catalysis, the catalyst compound is often referred to as a pre-catalyst or catalyst precursor. A "catalyst system" is a combination of at least one catalyst compound, at least one internal electron donor, one or more external electron donors, a co-catalyst, and/or a support where the system can polymerize monomers to produce a polymer under polymerization conditions of suitable temperature and pressure. For the purposes of this invention and the claims thereto, when catalyst systems are described as comprising neutral stable forms of the components, it is well understood by one of ordinary skill in the art that the ionic form of the component is the form that reacts with the monomers to produce polymers.

For purposes herein the term "catalyst productivity" is a measure of how many grams of polymer (P) are produced using a polymerization catalyst comprising (W) grams of catalyst (cat), over a period of time of (T) hours; and may be expressed by the following formula: P/(T×W) and expressed in units of $gPgcat^{-1} hr^{-1}$. "Conversion" is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

A "scavenger" is a compound that is typically added to facilitate oligomerization or polymerization by scavenging impurities. Some scavengers may also act as activators and may be referred to as co-activators. A co-activator, that is not a scavenger, may also be used in conjunction with an activator in order to form a catalyst system. In an embodiment, a co-activator can be pre-mixed with the catalyst compound to form an alkylated catalyst compound.

A "propylene polymer" is a polymer having at least 50 mol % of propylene. As used herein, Mn is number average molecular weight as determined by proton nuclear magnetic resonance spectroscopy ($^1$H NMR) or by gel permeation chromatography (GPC) unless stated otherwise, Mw is weight average molecular weight determined by gel permeation chromatography (GPC), and Mz is z average molecular weight determined by GPC, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bz is benzyl, THF is tetrahydrofuran, Mes is mesityl, also known as 1,3,5-trimethylbenzene, Tol is toluene, TMS is trimethylsilyl, and MAO is methylalumoxane. For purposes herein, "RT" is room temperature, which is defined as 25° C. unless otherwise specified. All percentages are in weight percent (wt %) unless otherwise specified.

For purposes herein, Mw, Mz number of carbon atoms, g value and $g'_{vis}$ may be determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001), and references therein. Three Polymer Laboratories PLgel 10 mm Mixed-B LS columns are used. The nominal flow rate is 0.5 cm$^3$/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers, and 0.1 otherwise, P(θ) is the form factor for a monodisperse random coil, and $K_o$ is the optical constant for the system:

$$K_o = \frac{4\pi^2 n^2 \left(\frac{dn}{dc}\right)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$, which is also referred to simply as g' is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis.

The term "g" also called a "g value" is defined to be $Rg^2_{pm}/Rg^2_{ls}$, where $Rg_{pm}$ is the radius of gyration for the polymacromer, $Rg^2_{ls}$ is the radius of gyration for the linear standard, and $Rg_{ls} = K_s M^{0.58}$ where $K_s$ is the power law coefficient (0.023 for linear polyethylene, 0.0171 for linear polypropylene, and 0.0145 for linear polybutene), and M is the molecular weight as described above, $Rg_{pm} = K_T M^{\alpha s}$. $\alpha_s$ is the size coefficient for the polymacromer, $K_T$ is the power law coefficient for the polymacromer. See Macromolecules, 2001, 34, 6812-6820, for guidance on selecting a linear standard having the molecular weight and comonomer content, and determining K coefficients and α exponents.

For purposes herein, a functionalized polymer comprises greater than 0.1 wt % of a functional group and/or a g'<0.95, and/or is the product of a post reactor functionalization or grafting process. Accordingly, for purposes herein a non-functionalized polymer comprises less than 0.1 wt % of a functional group, and/or is not the product of a post-reactor functionalization process, and/or is not a post-reactor grafted polymer, and/or has a g'>0.95 determined as described herein.

Ziegler-Natta Catalyst

In any embodiment, Ziegler-Natta catalysts suitable for use herein include solid titanium supported catalyst systems described in U.S. Pat. Nos. 4,990,479 and 5,159,021, and PCT Publication No. WO 00/63261, and others. Briefly, the Ziegler-Natta catalyst can be obtained by: (1) suspending a dialkoxy magnesium compound in an aromatic hydrocarbon that is liquid at ambient temperatures; (2) contacting the dialkoxy magnesium hydrocarbon composition with a titanium halide and with a diester of an aromatic dicarboxylic acid; and (3) contacting the resulting functionalized dialkoxy magnesium-hydrocarbon composition of step (2) with additional titanium halide.

In any embodiment, the catalyst system may be a solid titanium catalyst component comprising magnesium, titanium, halogen, a non-aromatic internal electron donor, and two or more external electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula:

$$Ti(OR_n)X_{4-n}$$

wherein R is a hydrocarbyl radical, X is a halogen atom, and n is from 0 to 4.

In any embodiment, suitable titanium compounds for use herein include: titanium tetra-halides such as $TiCl_4$, $TiBr_4$, and/or $TiI_4$; alkoxy titanium trihalides including $Ti(OCH_3)Cl_3$, $Ti(OC_2H_5)Cl_3$, $Ti(OC\ n-C_4H_9)Cl_3$, $Ti(OC_2H_5)Br_3$, and/or $Ti(O\ iso-C_4H_9)Br_3$; dialkoxytitanium dihalides including $Ti(OCH_3)_2Cl_2$, $Ti(OC_2H_5)_2Cl_2$, $Ti(O\ n-C_4H_9)_2Cl_2$ and/or $Ti(OC_2H_5)_2Br_2$; trialkoxytitanium monohalides including $Ti(OCH_3)_3Cl$, $Ti(OC_2H_5)_3Cl$, $Ti(O\ n-C_4H_9)_3Cl$ and/or $Ti(OC_2H_5)_3Br$; and/or tetraalkoxy titaniums including $Ti(OCH_3)_4$, $Ti(OC_2H_5)_4$, and/or $Ti(O\ n-C_4H_9)_4$.

In any embodiment, the halogen-containing titanium compound may be a titanium tetrahalide, or titanium tetrachloride. The titanium compounds may be used singly or in combination with each other. The titanium compound may be diluted with a hydrocarbon compound or a halogenated hydrocarbon compound.

In any embodiment, the magnesium compound to be used in the preparation of the solid titanium catalyst component may include a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. These magnesium compounds may be used singly or they may form complexes with the organo-aluminum co-catalyst as described herein. These magnesium compounds may be a liquid or a solid.

Suitable examples of the magnesium compounds having no reducibility include magnesium halides such as magnesium chloride, magnesium bromide, magnesium iodide, and magnesium fluoride; alkoxy magnesium halides, such as magnesium methoxy chloride, magnesium ethoxy chloride, magnesium isopropoxy chloride, magnesium phenoxy chloride, and magnesium methylphenoxy chloride; alkoxy magnesiums, such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and/or magnesium carboxylates, such as magnesium laurate and magnesium stearate.

In any embodiment, non-reducible magnesium compounds may be compounds derived from the magnesium compounds having reducibility, or may be compounds derived at the time of preparing the catalyst component. The magnesium compounds having no reducibility may be derived from the compounds having reducibility by, for example, contacting the magnesium compounds having reducibility with polysiloxane compounds, halogen-containing silane compounds, halogen-containing aluminum compounds, esters, alcohols, and the like.

In any embodiment, the magnesium compounds having reducibility and/or the magnesium compounds having no reducibility may be complexes of the above magnesium compounds with other metals, or mixtures thereof with other metal compounds. They may also be mixtures of two or more types of the above compounds. In any embodiment, halogen-containing magnesium compounds, including magnesium chloride, alkoxy magnesium chlorides and aryloxy magnesium chlorides may be used.

In any embodiment, a suitable solid catalyst component comprising a non-aromatic internal electron donor may be a catalyst solid sold by Lyondell-Basell Inc. under the trade name of Avant™ ZN-168. Such a catalyst is used to exemplify the invention, other titanium supported catalyst systems are contemplated. Other catalyst use mechanisms are contemplated. Including, but not limited to, batch prepolymerization, in situ prepolymerization and other such mechanisms.

Co-Catalyst

In any embodiment, supported Ziegler-Natta catalysts may be used in combination with a co-catalyst, also referred to herein as a Ziegler-Natta co-catalyst. In any embodiment, compounds containing at least one aluminum-carbon bond in the molecule may be utilized as the co-catalysts, also referred to herein as an organoaluminum co-catalyst. Suitable organoaluminum compounds include organoaluminum compounds of the general formula:

$$R^1{}_mAl(OR^2)_nH_pX_q$$

wherein $R^1$ and $R^2$ are identical or different, and each represents a hydrocarbyl radical containing from 1 to 15 carbon atoms, or 1 to 4 carbon atoms; X represents a halogen atom; and $0<m\leq3$, $0\leq n<3$, $0\leq p<3$, and $0\leq q<3$, and $m+n+p+q=3$.

Other suitable organoaluminum compounds include complex alkylated compounds of metals of Group I and aluminum represented by the general formula:

$$M^1AlR^1{}_4$$

wherein $M^1$ is Li, Na, or K and $R^1$ is as defined above.

Suitable organoaluminum compounds include compounds represented by the following general formulae:

$$R^1{}_mAl(OR^2)_{3-m}$$

wherein $R^1$ and $R^2$ are as defined above, and m is preferably $1.5 \leq m \leq 3$;

wherein $R^1$ is as defined above, X is halogen, and m is $0 < m < 3$, or $2 \leq m < 3$; and/or wherein $R^1$ and $R^2$ are as defined above, X is halogen, $0 < m \leq 3$, $0 \leq n \leq 3$, $0 \leq q \leq 3$, and $m+n+q=3$.

Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl aluminum ethoxide and dibutyl aluminum ethoxide; alkyl aluminum sesquialkoxides such as ethyl aluminum sesquiethoxide and butyl aluminum sesqui-butoxide; partially alkoxylated alkyl aluminums having an average composition represented by the general formula $R^1{}_{2.5}Al(OR^2)_{0.5}$; partially halogenated alkyl aluminums, for example, alkyl aluminum dihalides such as ethyl aluminum dichloride, propyl aluminum dichloride and butyl aluminum dibromide; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride, and ethyl aluminum ethoxybromide.

In any embodiment, the organoaluminum compound may comprise two or more aluminum atoms bonded through an oxygen or nitrogen atom. Examples include $(C_2H_5)_2AlOAl(C_2H_5)_2$, $(C_4H_9)_2AlOAl(C_4H_9)_2$, and/or methylaluminoxane (MAO). Other suitable examples include $LiAl(C_2H_5)_4$ and $LiAl(C_2H_{15})_4$. In any embodiment, the trialkyl aluminums and alkyl-aluminums resulting from bonding of at least two aluminum compounds may be used.

In any embodiment, the co-catalyst may be an organoaluminum compound that is halogen free. Suitable halogen free organoaluminum compounds are, in particular, branched unsubstituted alkylaluminum compounds of the formula $AlR_3$, where R denotes an alkyl radical having 1 to 10 carbon atoms, such as for example, trimethylaluminum, triethylaluminum, triisobutylaluminum and tridiisobutylaluminum. Additional compounds that are suitable for use as a co-catalyst are readily available and amply disclosed in the prior art including U.S. Pat. No. 4,990,477. In any embodiment, the organoaluminum Ziegler-Natta co-catalyst may be trimethyl aluminum, triethylaluminum (TEAL), or a combination thereof.

Internal Electron Donors

Electron donors suitable for use herein generally may be used in two ways in the formation of Ziegler-Natta catalysts and catalyst systems. In any embodiment, an internal electron donor may be used in the formation reaction of the catalyst as the transition metal halide is reacted with the metal hydride or metal alkyl. Examples of suitable internal electron donors include amines, amides, ethers, esters, esters, ketones, nitriles, phosphines, stilbenes, arsines, phosphoramides, thioethers, thioesters, aldehydes, alcoholates, and salts of organic acids. In any embodiment, the internal donor may be non-aromatic. In any embodiment, the non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof.

In any embodiment, the solid titanium catalyst component may be prepared using a non-aromatic internal electron donor. Examples of suitable non-aromatic internal electron donors include oxygen-containing electron donors such as alcohols, ketones, aldehydes, carboxylic acids, esters of organic or inorganic oxides, ethers, acid amides and acid anhydrides; nitrogen-containing electron donors such as ammonia, amines, nitriles, and/or isocyanates. Suitable examples include alcohols having 1 to 18 carbon atoms such as methanol, ethanol, propanol, pentanol, hexanol, octanol, 2-ethylhexanol, dodecanol, octadecyl alcohol, and the like; ketones having 3 to 15 carbon atoms such as acetone, methyl ethyl ketone, methyl isobutyl ketone, and the like; aldehydes having 2 to 15 carbon atoms such as acetaldehyde, propionaldehyde, octylaldehyde, and the like; organic acid esters having 2 to 30 carbon atoms including the esters desired to be included in the titanium catalyst component, such as methyl formate, ethyl formate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethylcyclohexanecarboxylate, diethyl 1,2-cyclohexanedicarboxylate, di(2-ethylhexyl)1,2-cyclohexanedicarboxylate, gamma-butyrolactone, delta-valerolactone, and/or ethylene carbonate; inorganic acid esters such as ethyl silicate and butyl silicate; acid halides having 2 to 15 carbon atoms such as acetyl chloride and the like; ethers having 2 to 20 carbon atoms, such as methyl ether, ethyl ether, isopropyl ether, butyl ether, amyl ether, tetrahydrofuran and the like; acid amides such as acetamide, and the like; acid anhydrides such as acetic anhydride, and the like; amines such as methylamine, ethyl-amine, triethylamine, tributylamine, tetramethyl-ethylenediamine, and the like; and nitriles such as acetonitrile, trinitrile, and the like.

In any embodiment, the non-aromatic internal electron donor may comprise a $C_1$ to $C_{20}$ diester of a substituted or unsubstituted $C_2$ to $C_{10}$ dicarboxylic acid. In any embodiment, the non-aromatic internal electron donor may be a succinate according to formula (I):

(I)

wherein $R^1$ and $R^2$ are independently $C_1$ to $C_{20}$ linear or branched alkyl, alkenyl, or cycloalkyl hydrocarbyl radicals; $R^3$ to $R^6$ are independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, wherein at least two of the $R^3$ to $R^6$ radicals are joined to form a cyclic divalent radical, or a combination thereof.

In any embodiment, $R^3$ to $R^5$ of formula I may be hydrogen and $R^6$ may be a radical selected from the group consistent of a primary branched, secondary or tertiary alkyl, or cycloalkyl radical having from 3 to 20 carbon atoms.

In any embodiment, the internal donor may be a monosubstituted non-aromatic succinate compound. Suitable examples include diethyl secbutylsuccinate, diethylhexylsuccinate, diethyl cyclopropylsuccinate, diethyl trimethylsilylsuccinate, diethyl methoxysuccinate, diethyl cyclohexylsuccinate, diethyl(cyclohexylmethyl)succinate, diethyl t-butylsuccinate, diethyl isobutylsuccinate, diethyl isopropylsuccinate, diethyl neopentylsuccinate, diethyl isopentylsuccinate, diethyl(1,1,1trifluoro-2-propyl)succinate, diisobutyl sec-butylsuccinate, diisobutylhexylsuccinate, diisobutyl cyclopropylsuccinate, diisobutyl trimethylsilylsuccinate, diisobutyl methoxysuccinate, diisobutyl cyclohexylsuccinate, diisobutyl(cyclohexylmethyl)succinate, diisobutyl t-butylsuccinate, diisobutyl isobutylsuccinate, diisobutyl isopropylsuccinate, diisobutyl neopentylsuccinate, diisobutyl isopentylsuccinate, diisobutyl(1,1,1-trifluoro-2-propyl)succinate, dineopentyl sec-butylsuccinate, dineopentyl hexylsuccinate, dineopentyl cyclopropylsuccinate, dineopentyl trimethylsilylsuccinate, dineopentyl methoxysuccinate, dineopentyl cyclohexylsuccinate, dineopentyl(cyclohexylmethyl)succinate, dineopentyl tbutylsuccinate, dineopentyl isobutylsuccinate, dineopentyl isopropylsuccinate, dineopentyl neopentylsuccinate, dineopentyl isopentylsuccinate, and/or dineopentyl(1,1,1-trifluoro-2propyl)succinate.

In any embodiment, the internal electron donor having a structure consistent with formula (I) may comprise at least two radicals from $R^3$ to $R^6$, which are different from hydrogen and are selected from $C_1$ to $C_{20}$ linear or branched alkyl, alkenyl, and/or cycloalkyl hydrocarbyl groups, which may contain heteroatoms. In any embodiment, two radicals different from hydrogen may be linked to the same carbon atom. Suitable examples include 2,2-disubstituted succinates including diethyl 2,2-dimethylsuccinate, diethyl 2-ethyl-2-methylsuccinate, diethyl 2-(cyclohexylmethyl)-2-isobutylsuccinate, diethyl 2-cyclopentyl-2-n-propylsuccinate, diethyl 2,2-diisobutylsuccinate, diethyl 2-cyclohexyl-2-ethylsuccinate, diethyl 2-isopropyl-2-methylsuccinate, diethyl 2,2-diisopropyl diethyl 2isobutyl-2-ethylsuccinate, diethyl 2-(1,1,1-trifluoro-2-propyl)-2-methylsuccinate, diethyl 2 isopentyl-2-isobutylsuccinate, diisobutyl 2,2dimethylsuccinate, diisobutyl 2-ethyl-2-methylsuccinate, diisobutyl 2-(cyclohexylmethyl)-2-isobutylsuccinate, diisobutyl 2-cyclopentyl-2-n-propylsuccinate, diisobutyl 2,2-diisobutylsuccinate, diisobutyl 2-cyclohexyl-2-ethylsuccinate, diisobutyl 2-isopropyl-2-methylsuccinate, diisobutyl 2-isobutyl-2-ethylsuccinate, diisobutyl 2-(1,1,1-trifluoro-2-propyl)-2-methylsuccinate, diisobutyl 2-isopentyl-2-isobutylsuccinate, diisobutyl 2,2-diisopropylsuccinate, dineopentyl 2,2-dimethylsuccinate, dineopentyl 2-ethyl-2-methylsuccinate, dineopentyl 2-(cyclohexylmethyl)-2isobutylsuccinate, dineopentyl 2-cyclopentyl-2-n-propylsuccinate, dineopentyl 2,2-diisobutylsuccinate, dineopentyl 2-cyclohexyl-2-ethylsuccinate, dineopentyl 2-isopropyl-2methylsuccinate, dineopentyl 2-isobutyl-2-ethylsuccinate, dineopentyl 2-(1,1,1-trifluoro-2-propyl)-2-methylsuccinate, dineopentyl 2,2-diisopropylsuccinate, and/or dineopentyl 2-isopentyl-2isobutylsuccinate.

In any embodiment, at least two radicals different from hydrogen may be linked to different carbon atoms between $R^3$ and $R^6$. Examples include $R^3$ and $R^5$ or $R^4$ and $R^6$. Suitable non-aromatic succinate compounds include: diethyl 2,3-bis(trimethylsilyl)succinate, diethyl 2,2-secbutyl-3-methylsuccinate, diethyl 2-(3,3,3-trifluoropropyl)-3-methylsuccinate, diethyl 2,3bis(2-ethylbutyl)succinate, diethyl 2,3-diethyl-2-isopropylsuccinate, diethyl 2,3-diisopropyl-2methylsuccinate, diethyl 2,3-dicyclohexyl-2-methylsuccinate, diethyl 2,3-diisopropylsuccinate, diethyl 2,3-bis(cyclohexylmethyl)succinate, diethyl 2,3-di-tbutyl-succinate, diethyl 2,3-diisobutylsuccinate, diethyl 2,3-dineopentylsuccinate, diethyl 2,3 diisopentylsuccinate, diethyl 2,3-(1-trifluoromethyl-ethyl)succinate, diethyl 2-isopropyl-3-isobutylsuccinate, diethyl 2-t-butyl-3isopropylsuccinate, diethyl 2-isopropyl-3-cyclohexylsuccinate, diethyl 2-isopentyl-3cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3-bis(trimethylsilyl)succinate, diisobutyl 2,2-sec-butyl-3-methylsuccinate, diisobutyl 2-(3,3,3-trifluoropropyl)-3-methylsuccinate, diisobutyl 2,3-bis(2-ethylbutyl) succinate, diisobutyl 2,3-diethyl-2 isopropylsuccinate, diisobutyl 2,3-diisopropyl-2-methylsuccinate, diisobutyl 2,3-dicyclohexyl2-methylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3diisopentylsuccinate, diisobutyl 2,3-(1,1,1-trifluoro-2-propyl)succinate, diisobutyl 2,3-n-propylsuccinate, diisobutyl 2-isopropyl-3ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3bis(trimethylsilyl)succinate, dineopentyl 2,2-di-sec-butyl-3-methylsuccinate, dineopentyl 2(3,3,3-trifluoropropyl)-3-methylsuccinate, dineopentyl 2,3 bis(2-ethylbutyl) succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3 dineopentylsuccinate, dineopentyl 2,3-diisopentylsuccinate, dineopentyl 2,3-(1,1,1-trifluoro-2propyl)succinate, dineopentyl 2,3-n-propylsuccinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3 cyclohexylsuccinate, dineopentyl 2-n-propyl-3-(cyclohexylmethyl)succinate, dineopentyl 2 cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, and/or dineopentyl 2,3-diethyl 2,3-diisopropylsuccinate.

In any embodiment, the compounds according to formula (I) may include two or four of the radicals $R^3$ to $R^6$ joined to the same carbon atom which are linked together to form a cyclic multivalent radical. Examples of suitable compounds include 1-(ethoxycarbonyl)-1-(ethoxyacetyl)-2,6-dimethylcyclohexane, 1-(ethoxycarbonyl)-1-(ethoxyacetyl)-2,5-dimethyl-cyclopentane, 1-(ethoxycarbonyl)-1-(ethoxyacetylmethyl)-2-methylcyclohexane, and/or 1-(ethoxycarbonyl)-1-(ethoxy(cyclohexyl)acetyl)cyclohexane.

For purposes herein, all the above mentioned compounds can be used either in form of pure stereoisomers or in the form of mixtures of enantiomers, or mixture of diastereoisomers and enantiomers. When a pure isomer is to be used it may be isolated using the common techniques known in the art. In particular, some of the succinates of the present invention can be used as a pure rac or meso forms, or as mixtures thereof, respectively.

In any embodiment, the internal electron donor compound may be selected from the group consisting of diethyl 2,3-diisopropylsuccinate, diisobutyl 2,3-diisopropylsuccinate, di-n-butyl 2,3-diisopropylsuccinate, diethyl 2,3-dicyclohexyl-2-methylsuccinate, diisobutyl 2,3-dicyclohexyl-2-methylsuccinate, diisobutyl 2,2-dimethylsuccinate, diethyl 2,2-dimethylsuccinate, diethyl 2-ethyl-2-methylsuccinate, diisobutyl 2-ethyl-2-methylsuccinate, diethyl 2-(cyclohexylmethyl)-3-ethyl-3-methylsuccinate, diisobutyl 2-(cyclohexylmethyl)-3-ethyl-3-methylsuccinate, and combinations thereof.

External Electron Donors

In any embodiment, in conjunction with an internal donor, two or more external electron donors may also use in combination with a catalyst. External electron donors include, but are not limited to, organic silicon compounds, e.g., tetraethoxysilane (TEOS), methylcyclohexyldimethoxysilane (MCMS), propyltriethoxysilane (PTES) and dicyclopentydimethoxysilane (DCPMS). Internal and external-type electron donors are described, for example, in U.S. Pat. No. 4,535,068. The use of organic silicon compounds as external electron donors is described, for example, in U.S. Pat. No. 4,218,339; U.S. Pat. No. 4,395,360; U.S. Pat. No. 4,328,122; and U.S. Pat. No. 4,473,660. The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereoregulating capability and hydrogen response of a given external electron donor are directly and inversely related. The DCPMS donor has a substantially lower hydrogen response than the PTES donor, but produces a significantly higher level of stereoregularity than PTES.

In any embodiment, the two external electron donors A and B, also referred to herein as the first external electron donor and the second external electron donor, may be selected such that the melt flow rate MFR (A) of homopolypropylene obtained by homopolymerizing propylene by using the first external electron donor (A) in combination with the solid titanium catalyst component and the organoaluminum compound catalyst component and the MFR (B) of homopolypropylene obtained by homopolymerizing propylene by using the second external electron donor (B) under the same conditions as in the case of using the external electron donor (A) have the following relation:

1.2≤log [MFR(B)/MFR(A)]≤1.4.

The external electron donors to be used in the preparation of the electron donor catalyst component may be those electron donors which are used in preparing the solid titanium catalyst component. In any embodiment, each of the external electron donors (A) and (B) may comprise organic silicon compounds.

In any embodiment, one or more of the external electron donors may comprise an organic silicon compound of formula:

wherein $R^3$ and $R^4$ independently represent a hydrocarbyl radical and 0<n<4.

Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxy-silane, dicyclohexyldiethoxysilane, cyclohexylmethyl-dimethoxysilane, cyclohexylmethyldiethoxysilane, ethyltrimethoxysilane, ethyltriethoxysilane, vinyl-trimethoxysilane, methyltrimethoxysilane, n-propyltriethoxysilane, decyltrimethoxysilane, decyltriethoxy-silane, phenyltrimethoxysilane, [gamma]-chloropropyltrimethoxysilane, methyltriethoxysilane, ethyltriethoxy-silane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbornanetriethoxysilane, 2-norbornanemethyldimethoxy-silane, ethyl silicate, butyl silicate, trimethyl-phenoxysilane, methylallyloxysilane, vinyltris(beta-methoxyethoxysilane), vinyltriacetoxysilane, and/or dimethyltetraethoxydisiloxane.

In any embodiment, one of the two or more organic silicon compounds may comprise the formula:

wherein $R^1$ represents a hydrocarbyl radical in which the carbon adjacent to Si is secondary or tertiary. Suitable examples include substituted and unsubstituted alkyl groups such as isopropyl, sec-butyl, t-butyl and t-amyl groups, cyclo-alkyl groups such as cyclopentyl and cyclohexyl groups, cycloalkenyl groups such as a cyclopentenyl group, and aryl groups such as phenyl and tolyl groups. In any embodiment, $R^2$ may represent a hydrocarbyl radical, or a hydrocarbyl radical having 1 to 5 carbon atoms, or a hydrocarbyl radical having 1 or 2 carbon atoms.

Examples of suitable organic silicon compound include diisopropyldimethoxysilane, diisopropyldiethoxysilane, di-sec-butyldimethoxysilane, di-t-butyldimethoxysilane, di-t-amyldimethoxysilane, dicyclopentyldimethoxysilane, dicyclohexyldimethoxy-silane, diphenyldimethoxysilane, bis-o-tolyldimethoxy-silane, bis-m-tolyldimethoxysilane, bis-p-tolyldi-methoxysilane, and/or bis-ethylphenyldimethoxysilane.

In any embodiment, the organic silicon compound may be represented by the following general formula:

wherein n is 2, $R^1$ each represents a hydrocarbyl radical and at least one of the two hydrocarbyl radicals is a hydrocarbon group in which the carbon adjacent to Si is a primary carbon. Examples of suitable hydrocarbon groups include alkyl groups such as ethyl, n-propyl and n-butyl groups, aralkyl groups such as cumyl and benzyl groups, and alkenyl groups such as a vinyl group, and the like.

In any embodiment, $R^2$ may represent a hydrocarbyl radical preferably having 1 to 5 carbon atoms, or from 1 to 2 carbon atoms. Suitable examples of the organic silicon compounds in which n is 2 include diethyldimethoxysilane, dipropyldimethoxysilane, di-n-butyldimethoxysilane, dibenzyldimethoxysilane, and/or divinyldimethoxysilane.

Examples of suitable compounds when 0≤n<2 or 2<n<4 include $R^1$ being an alkyl, cycloalkyl, alkenyl, aryl or aralkyl group and $R^2$ represents a hydrocarbyl radical having 1 to 5 carbon atoms, or 1 to 2 carbon atoms.

Suitable examples of the organic silicon compounds in which 0≤n<2 or 2<n<4 include trimethylmethoxysilane, trimethylethoxysilane, methyl-phenyldimethoxysilane, methyltrimethoxysilane, t-butyl-methyldimethoxysilane, t-butylmethyldiethoxysilane, t-amylmethyldimethoxysilane, phenylmethyldimethoxysilane, cyclohexylmethyldimethoxysilane, cyclohexylmethyldi-ethoxysilane, ethyltrimethoxysilane, ethyltriethoxy-silane, vinyltriethoxysilane, methyltrimethoxysilane, methyltriethoxysilane, propyltrimethoxysilane, decyl-trimethoxysilane, decyltriethoxysilane, phenyltrimethoxysilane, propyltriethoxysilane, butyltriethoxy-silane, phenyltriethoxysilane, vinyltrimethoxysilane, vinyltributoxysilane, cyclohexyltrimethoxysilane, 2-norbornanetrimethoxysilane, and/or 2-norbornanetriethoxy-silane.

In any embodiment the external electron donors include methyltrimethoxysilane, ethyltrimethoxysilane, ethyltriethoxysilane, vinyltriethoxysilane, propyltrimethoxysilane, decyl-trimethoxysilane, decyltriethoxysilane, propyltriethoxysilane, butyltriethoxysilane, phenyltriethoxy-silane, vinyltrimethoxysilane, vinyltributoxysilane and/or cyclohexyltrimethoxysilane.

In any embodiment, the above disclosed organic silicon compounds may be used such that a compound capable of being changed into such an organic silicon compound is added at the time of polymerizing or preliminarily polymerizing an olefin, and the organic silicon compound may be formed in situ during the polymerization or the preliminary polymerization of the olefin.

In any embodiment, a first external electron donor may have the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and a second external electron donor having the formula $R^3_nSi(OR^4)_{4-n}$, wherein each $R^3$ and $R^4$ are independently a hydrocarbyl radical comprising from 1 to 10 carbon atoms, and n is 1, 2, or 3; and the second external electron donor is different than the first external electron donor.

In any embodiment, the first external electron donor and the second external electron donor may be selected from the group consisting of tetraethoxysilane, methylcyclohexyldimethoxysilane, propyltriethoxysilane, dicyclopentydimethoxysilane, and combinations thereof. In any embodiment, the Ziegler-Natta catalyst system may comprise 2.5 mol % to less than 50 mol % of the first external electron donor and greater than 50 mol % of a second external electron donor based on total mol % of external electron donors. In any embodiment, the first electron donor may comprise, consist of, or consist essentially of dicyclopentyldimethoxysilane (DCPMS) and the second external electron donor may comprise, consist of, or consist essentially of propyltriethoxysilane (PTES).

In any embodiment, a relationship between the first external electron donor and the second external electron donor may be defined by the equation:

$$1.2 \leq \log[MFR(B)/MFR(A)] \leq 1.4$$

wherein MFR(A) is a first melt flow rate of a homopolymer formed by polymerizing propylene monomers in the presence of the Ziegler-Natta catalyst and the first external electron donor, and wherein MFR(B) is a second melt flow rate of a homopolymer formed by polymerizing propylene monomers in the presence of the Ziegler-Natta catalyst and the second external electron donor, and wherein the MFR(A) is lower than the MFR(B).

Polymerization Process

In any embodiment, a method to make a polypropylene resin may comprise contacting propylene monomers at propylene polymerization conditions with a catalyst system to produce a polypropylene resin comprising at least 50 mol % propylene, an MWD greater than 5 and a melt strength of at least 20 cN determined using an extensional rheometer at 190° C., the catalyst system comprising: a Ziegler-Natta catalyst comprising a non-aromatic internal electron donor; and first and second external electron donors comprising different organosilicon compounds. In any embodiment, the first external electron donor may have the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3_nSi(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor.

In any embodiment, the non-aromatic internal electron donor may comprise an aliphatic amine, amide, ester, ether, ketone, nitrile, phosphine, phosphoramide, thioether, thioester, aldehyde, alcoholate, carboxylic acid, or a combination thereof, or a $C_1$ to $C_{20}$ diester of a substituted or unsubstituted $C_2$ to $C_{10}$ dicarboxylic acid, or a succinate according to the formula:

wherein $R^1$ and $R^2$ are, independently, $C_1$ to $C_{20}$ linear or branched alkyl, alkenyl, or cycloalkyl hydrocarbyl radicals; $R^3$ to $R^6$ are, independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, or wherein at least two of the $R^3$ to $R^6$ radicals are joined to form a cyclic divalent radical, or a combination thereof.

In any embodiment, the polymerization process according to the instant disclosure may include contacting propylene with any embodiment herein described of the catalyst system under polymerization conditions. In any embodiment, the polymerization process may include a preliminary polymerization step. In any embodiment, the preliminary polymerization may include utilizing the Ziegler-Natta catalyst system comprising the non-aromatic internal electron donor in combination with at least a portion of the organoaluminum co-catalyst wherein at least a portion of the external electron donors are present wherein the catalyst system is utilized in a higher concentration than utilized in the subsequent "main" polymerization process.

In any embodiment, the concentration of the catalyst system in the preliminary polymerization, based on the moles of titanium present, may be 0.01 to 200 millimoles, or 0.05 to 100 millimoles, calculated as a titanium atom, per liter of an inert hydrocarbon medium. In any embodiment, the organoaluminum co-catalyst may be present in an amount sufficient to produce 0.1 to 500 g, or 0.3 to 300 g, of a polymer per gram of the titanium catalyst present, and may be present at 0.1 to 100 moles, or 0.5 to 50 moles, per mole of the titanium atom present in the catalyst component.

In any embodiment, the preliminary polymerization may be carried out under mild conditions in an inert hydrocarbon medium in which an olefin and the catalyst components are present. Examples of the inert hydrocarbon medium used include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures thereof. The olefin used in the preliminary polymerization may be the same as an olefin to be used in the main polymerization.

In any embodiment, the reaction temperature for the preliminary polymerization may be a point at which the resulting preliminary polymerization does not dissolve substantially in the inert hydrocarbon medium, which may be −20 to +100° C., or −20 to +80° C., or from 0 to 40° C.

In any embodiment, during the preliminary polymerization, a molecular weight controlling agent such as hydrogen may be used. The molecular weight controlling agent may desirably be used in such an amount that the polymer obtained by preliminary polymerization has properties consistent with the intended product. In any embodiment, the preliminary polymerization may be carried out so that 0.1 to 1000 g, or 0.3 to 300 g, of a polymer forms per gram of the titanium catalyst.

In any embodiment, a method for making a polypropylene resin may comprise contacting propylene monomers at a temperature and a pressure in the presence of catalyst system to produce a propylene resin comprising at least 50 mol % propylene, wherein the catalyst system comprises:

a Ziegler-Natta catalyst comprising a non-aromatic internal electron donor;

a first external electron donor having the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and a second external electron donor having the formula $R^3{}_nSi(OR^4)_{4-n}$, wherein each $R^3$ and $R^4$ are independently a hydrocarbyl radical comprising from 1 to 10 carbon atoms, n is 1, 2, or 3; and the second external electron donor is different than the first external electron donor.

In any embodiment, the propylene polymer resin may have a melt strength of at least 20 cN determined using an extensional rheometer at 190° C.

In any embodiment, the olefin may comprise or consist essentially of propylene. In any embodiment, the olefin may comprise from 0 to 49% of an alpha olefin other than propylene, as defined herein. In any embodiment, the alpha olefin may include ethylene, 1-butene, 4-methyl-1-pentene, 1-octene, or a combination thereof. In any embodiment, the olefin may comprise at least 50 wt % propylene, or at least 75 wt %, or at least 99 wt % propylene.

In any embodiment, the polymerization of the olefin may be carried out in the gaseous phase, the liquid phase, bulk phase, slurry phase, or any combination thereof.

In any embodiment, polymerization may be carried out by slurry polymerization wherein the inert hydrocarbon may be used as a reaction solvent, or an olefin liquid under the reaction conditions may be used as the solvent.

In any embodiment, the titanium catalyst may be present in the reactor at 0.005 to 0.5 millimole, preferably 0.01 to 0.5 millimole, based on Ti moles per liter of the reaction zone. In any embodiment, the organoaluminum co-catalyst may be present in an amount sufficient to produce 1 to 2,000 moles, or 5 to 500 moles of aluminum per mole of the titanium atom in the catalyst system. In any embodiment, the internal electron donor may be present at 0.2 to 5.0, or 0.5 to 2.0 per mole of Ti.

In any embodiment, the total amount of the external electron donors may be 0.001 to 50 moles, or 0.01 to 20 moles, or 0.05 to 10 mole Si per mole of Ti present.

In any embodiment, the first external electron donor may be present in the catalyst system at from 2.5 to 50 mol %, or 2.5 to 10 mol % of the total amount of external electron donor present.

In any embodiment, the polymerization process may include contacting the titanium catalyst component, the internal electron donor, the organoaluminum co-catalyst, and the two external electron donors with each other at the time of the main polymerization, before the main polymerization, for example, at the time of the preliminary polymerization, or a combination thereof. In contacting them before the main polymerization, any two or more of these components may be freely selected and contacted. In any embodiment, two or more of the components may be contacted individually or partly and then contacted with each other in total to produce the catalyst system.

In any embodiment, the catalyst system components may be contacted with each other before the polymerization in an inert gaseous atmosphere, the individual catalyst components may be contacted with each other in an olefin atmosphere, or any combination thereof.

In any embodiment, hydrogen may be used during the polymerization to control the molecular weight and other properties of the resulting polymer.

In any embodiment, polymerization conditions may include a polymerization temperature of 20 to 200° C., or 50 to 180° C., and a pressure from atmospheric pressure to 100 kg/cm², or from 2 to 50 kg/cm². The polymerization process according to the instant disclosure may be carried out batchwise, semicontinuously, or continuously. The polymerization may be carried out in two or more stages, using two or more reactors under different reaction conditions, utilizing different internal electron donors, different external electron donors, and/or different catalyst systems.

In any embodiment, the polypropylene resin according to the instant disclosure may be produced in a bulk continuous reactor. A catalyst system comprising a magnesium chloride supported titanium catalyst according to one or more embodiments of the instant disclosure is utilized. Catalyst preparation may be carried out continuously in situ by contacting the catalyst solids, triethylaluminum, and the external electron donor system under conditions known in the art to yield active, stereospecific catalyst for polymerization of propylene. The activated catalyst may then be continuously fed into a prepolymerization reactor where it was continuously polymerized in propylene to a productivity of approximately 100 to 400 g-polymer/g-cat. The prepolymerized catalyst may then be continuously fed into a bulk slurry reactor, and polymerization continued at 70° C. to 80° C., for a residence time of 90 minutes. The reaction slurry (homopolymer granules in bulk propylene) may then be removed from the reactor and the polymer granules continuously separated from the liquid propylene. The polymer granules may then be separated from the unreacted monomer to produce a granular product for compounding and/or mechanical properties. In any embodiment, hydrogen may be used in the reactor to control the melt flow rate of the polypropylene resin.

In the case of impact copolymer resin production, the granules from the bulk reactor, after removing the monomer, may be fed directly into a gas phase reactor (GPR) where polymerization is continued under conditions known in the art to produce ethylene-propylene bipolymer within the pores of the polymer granules. The final product, referred to in the art as an "impact copolymer," may be continuously withdrawn from the gas phase reactor and separated from unreacted monomer to produce a granular product for compounding and further processing. The molecular weight of the ethylene-propylene rubber or more appropriately, Intrinsic Viscosity (IV) of the rubber phase may be controlled by the concentration of hydrogen in the GPR.

In any embodiment, the granules from the reactor may be stabilized with at least 0.01 wt % of an additive, e.g., 0.15 wt % Irganox™ 1010, 0.05 wt % Ultranox™ 626A, and/or with 0.075 wt % sodium benzoate (fine form) and then pelletized, e.g., on a 30 mm Werner & Pfleiderer twin screw extruder. The pellets may then be injection molded, and/or subjected to further processing.

Polypropylene Resins

In any embodiment, a polypropylene resin may comprise at least 50 mol % propylene and has a melt strength of at least 20 cN determined using an extensional rheometer at 190° C. For purposes herein, the melt strength of a polymer at a particular temperature, e.g., 190° C., is determined with a Gottfert Rheotens Melt Strength Apparatus (e.g., Gottfert Rheotens 71.97). The measurement is accomplished by grasping the extrudate from a capillary rheometer (e.g., a Gottfert Rheograph 2002 capillary rheometer), or from an extruder equipped with a capillary die, after the extrudate has been extruded 100 mm using variable speed gears and increasing the gear speed at a constant acceleration (12 mm/s$^2$, starting from an initial, zero-force calibration velocity of 10 mm/s) until the molten polymer strand breaks. The force in the strand is measured with a balance beam in conjunction with a linear variable displacement transducer. The force required to extend and then break the extrudate is defined as the melt strength. The force is measured in centinewtons (cN). A typical plot of force vs. wheel velocity is known in the art to include a resonate immediately before the strand breaks. In such cases, the plateau force is approximated by the midline between the oscillations.

One of the most distinctive improvements of the instant disclosure is an unexpectedly high melt strength. Melt strength is a key property of products used in blown film, thermoforming, blow molding processes, and the like. In a blown film process, high melt strength is required to maintain a stable bubble when running at high temperatures and/or at high production rates, especially on large lines. If the melt strength is unacceptably low, holes form in a molten web, which causes the bubble to collapse and occasionally tear off. This, in turn, results in loss of production, and can lead to subsequent quality problems if the material in the extruder begins to degrade during the down-time. Low melt strength in linear polyethylenes precludes the film manufacturer from taking advantage of the excellent draw-down characteristics inherent with most linear polyethylenes unless a melt strength enhancer, such as LDPE, is added.

A polypropylene resin according to any of the embodiments disclosed herein may comprise at least 50 mol % propylene and have a melt strength of at least 35 cN, or at least 40 cN, or at least 45 cN, or at least 50 cN, or at least 55 cN, or at least 60 cN, or at least 65 cN, or at least 70 cN, or at least 75 cN, or at least 80 cN, or from 50 cN to 200 cN, or from 60 cN to 150 cN, or from 70 cN to 200 cN, or any combination thereof, determined using an extensional rheometer at 190° C. as described herein.

A polypropylene resin according to any of the embodiments disclosed herein may comprise at least 50 mol % propylene and has an MWD (Mw/Mn) of greater than 5, or greater than or equal to 6, or from 6 to 20, or from 6 to 15, or any combination thereof.

A polypropylene resin according to any of the embodiments disclosed herein further may comprise at least 75 mol %, or at least 80 mol %, or at least 90 mol %, or at least 95 mol %, or at least 99 mol % propylene. In any embodiment a polypropylene resin according to any of the embodiments disclosed herein may be a propylene homopolymer.

A polypropylene resin according to any of the embodiments disclosed herein may comprise from 0.1 to 10 mol % of a comonomer. In any embodiment, the comonomer may be an alpha olefin. In any embodiment, the comonomer may be selected from the group consisting of ethylene and $C_4$ to $C_{20}$ olefins.

A polypropylene resin according to any of the embodiments disclosed herein may have a branching index (g') of at least 0.95, or at least 0.99.

A polypropylene resin according to any of the embodiments disclosed herein may have a stiffness of greater than 2000 MPa, or greater than 2100 MPa, or 290 kpsi (2000 MPa) to 360 kpsi (2500 MPa) determined according to ASTM D790A on nucleated samples with 0.1% sodium benzoate.

A polypropylene resin according to any of the embodiments disclosed herein may have a viscosity ratio of greater than or equal to 35, or 40, or 45, or from 35 to 80 determined at an angular frequency ratio of 0.01 and at an angular frequency ratio of 100 rad/s (at an angular frequency ratio of 0.01 to 100 rad/s) at a fixed strain of 10% at 190° C.

A polypropylene resin according to any of the embodiments disclosed herein may have a MFR range from 0.1 to 100, or from 0.3 to 10, when determined according to ASTM D1238 Condition L.

A polypropylene resin according to any of the embodiments disclosed herein may be an impact copolymer. For purposes herein, an impact copolymer refers to a resin comprising a homopolymer made in a bulk polymerization reactor followed by transferring the granules to the gas phase reactor and making ethylene-propylene rubber within the granules.

In any embodiment, the polypropylene resin may be a non-functionalized polymer or resin. For purposes herein, a non-functionalized resin does not comprise grafted or otherwise post-reactor processed olefin polymers. By functionalized (or grafted) it is meant that various functional groups are incorporated, grafted, bonded to, and/or physically or chemically attached to the polymer backbone of the polymer being functionalized after formation of the base polymer. Examples of functionalized polymers include polymers in which functional groups are grafted onto the polymer backbone or pendent groups utilizing radical copolymerization of a functional group, referred to in the art as graft copolymerization. Examples of functional groups utilized to produce functionalized polymers include unsaturated carboxylic acids, esters of the unsaturated carboxylic acids, acid anhydrides, di-esters, salts, amides, imides, aromatic vinyl compounds, hydrolyzable unsaturated silane compounds, and unsaturated halogenated hydrocarbons. Specific examples of unsaturated carboxylic acids and acid derivatives include, but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2) oct-5-ene-2,3-dicarboxylic acid anhydride, 1,2,3,4,5,&g,lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA). Examples of the esters of the unsaturated carboxylic acids include methyl acrylate, ethyl acrylate, butyl acrylate, methyl methacrylate, ethyl methacrylate, and butyl methacrylate. Hydrolyzable unsaturated silane compounds useful as functional groups present in functionalized polymers include a radical polymerizable unsaturated group having an alkoxysilyl group or a silyl group in its molecule. Examples include a compound having a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid, or the like. Examples thereof include vinyltrichlorosilane, vinyltris(beta-methoxyethoxy)silane, vinyltriethoxysilane, vinyltrimethoxysilane, gamma-methacryloxypropyltrimethoxysilane, monovinylsilane, and monoallylsilane. Examples of unsaturated halogenated hydrocarbons useful as functional groups include vinyl chloride and vinylidene chloride. For purposes herein, functionalized polymers further include polymers grafted onto other polymers.

A functionalized polymer is considered to have indications of long chain branching (i.e., a g' less than 0.95), consistent with the cross-linking and intermolecular bonding associated with functionalized polymers.

For purposes herein, a functionalized polymer comprises greater than 0.1 wt % of a functional group and/or a g'<0.95, and/or is the product of a post reactor functionalization or grafting process. Accordingly, in any embodiment, the non-functionalized polymer may comprise less than 0.1 wt % of a functional group and/or is not the product of a post-reactor functionalization process, and/or is not a post-reactor grafted polymer and/or has a g'>0.95 determined as described herein.

The resin may be produced by contacting propylene monomers at propylene polymerization conditions with a catalyst system comprising a Ziegler-Natta catalyst comprising a non-aromatic internal electron donor, and first and second external electron donors comprising different organosilicon compounds.

In any embodiment the resin may be free of functionalized polypropylene or comprises less than 5 weight percent of functional groups selected from hydroxide, aryls, substituted aryls, halogens, alkoxys, carboxylates, esters, acrylates, and carboxyl, based upon the weight of the polypropylene resin, and wherein the number of carbons of the polypropylene resin involved in olefinic bonds is less than 5% of the total number of carbon atoms in the resin. In any embodiment, the resin may be free of post-reactor grafted polypropylene or comprises less than 5 percent by weight of post-reactor grafted polypropylene.

A polypropylene resin according to any of the embodiments disclosed herein may have a heat distortion temperature of greater than or equal to 100° C., determined according to ASTM D648 using a load of 0.45 MPa (66 psi).

A polypropylene resin according to any of the embodiments disclosed herein may have an isopentad percentage of greater than 90%, or greater than 95%, or greater than 99%.

A polypropylene resin according to any of the embodiments disclosed herein may comprise a blend of various components. The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like. Accordingly, a polypropylene resin according to any of the embodiments disclosed herein further may comprise greater than or equal to 0.01 wt % of one or more fillers; antioxidants; anti-cling agents; tackifiers; UV stabilizers; heat stabilizers; anti-blocking agents; release agents; anti-static agents; pigments; colorants; dyes; waxes; silica; talc; or a combination thereof.

A polypropylene resin according to any of the embodiments disclosed herein may comprise at least 50 mol % propylene, has a melt strength of at least 20 cN determined using an extensional rheometer at 190° C., and an MWD (Mw/Mn) of greater than 5, wherein the resin is produced by contacting propylene monomers at a temperature and a pressure according to any method or process disclosed herein utilizing any embodiment or combination of embodiments of the catalyst system as disclosed herein.

A polypropylene resin according to any of the embodiments disclosed herein may comprise at least 50 mol % propylene, has a melt strength of at least 20 cN determined using an extensional rheometer at 190° C., and an MWD (Mw/Mn) of greater than 5, wherein the resin is produced by contacting propylene monomers at a temperature and a pressure in the presence of catalyst system comprising a Ziegler-Natta catalyst comprising a non-aromatic internal electron donor and two or more external electron donors. In any embodiment, the first external electron donor may have the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3_nSi(OR^4)_{4-n}$, wherein each $R^3$ and $R^4$ are independently a hydrocarbyl radical comprising from 1 to 10 carbon atoms, wherein n is 1, 2, or 3; and wherein the second external electron donor is different than the first external electron donor.

Accordingly, the instant disclosure relates to the following embodiments:

E1. A polypropylene resin, comprising:
at least 50 mol % propylene;
an MWD (Mw/Mn) greater than 5;
a branching index (g') of at least 0.95; and
a melt strength greater than 20 cN determined using an extensional rheometer at 190° C.

E2. The resin of embodiment E1, wherein the MWD is from 6 to 15.

E3. The resin of any of the above embodiments, wherein the melt strength is from 50 cN to 200 cN.

E4. The resin of any of the above embodiments, comprising a viscosity ratio of from 35 to 80 determined from the complex viscosity ratio at 0.01 to 100 rad/s angular frequency at a fixed strain of 10% at 190° C.

E5. The resin of any of the above embodiments, having a heat distortion temperature of greater than or equal to 100° C., determined according to ASTM D648 using a load of 0.45 MPa (66 psi).

E6. The resin of any of the above embodiments, wherein the resin is an impact copolymer.

E7. The resin of any of the above embodiments, wherein the resin comprises at least 99 mol % propylene.

E8. The resin of any of the above embodiments, wherein the resin comprises from 0.1 to 10 mol % of a comonomer selected from the group consisting of ethylene and $C_4$ to $C_{20}$ olefins.

E9. The resin of any of the above embodiments, comprising an isopentad percentage of greater than 95%.

E10. The resin of any of the above embodiments, having an MFR from 0.1 to 100, determined according to ASTM D1238 Condition L.

E11. The resin of any of the above embodiments, comprising a stiffness of from 2000 MPa (290 kpsi) to 2500 MPa (360 kpsi) determined according to ASTM D790A on nucleated samples with 0.1% sodium benzoate.

E12. The resin of any of the above embodiments, further comprising greater than or equal to 0.01 wt % of one or more fillers; antioxidants; anti-cling agents; tackifiers; UV stabilizers; heat stabilizers; anti-blocking agents; release agents; anti-static agents; pigments; colorants; dyes; waxes; silica; talc; or a combination thereof.

E13. The resin of any of the above embodiments, wherein the resin is produced by contacting propylene monomers at propylene polymerization conditions with a catalyst system comprising a Ziegler-Natta catalyst comprising a non-aromatic internal electron donor, and first and second external electron donors comprising different organosilicon compounds.

E14. The resin of any of the above embodiments, wherein the resin is free of functionalized polypropylene or comprises less than 5 weight percent of functional groups selected from hydroxide, aryls, substituted aryls, halogens, alkoxys, carboxylates, esters, acrylates, and carboxyl, based upon the weight of the polypropylene resin, and wherein the number of carbons of the polypropylene resin involved in olefinic bonds is less than 5% of the total number of carbon atoms in the resin.

E15. The resin of any of the above embodiments, wherein the resin is free of post-reactor grafted polypropylene or comprises less than 5 percent by weight of post-reactor grafted polypropylene.

E16. A method to make a polypropylene resin, comprising:
contacting propylene monomers at propylene polymerization conditions with a catalyst system to produce a polypropylene resin comprising at least 50 mol % propylene, an MWD greater than 5, and a melt strength of at least 20 cN determined using an extensional rheometer at 190° C., the catalyst system comprising:
a Ziegler-Natta catalyst comprising a non-aromatic internal electron donor; and
first and second external electron donors comprising different organosilicon compounds.

E17. The method of embodiment E16, wherein:
the first external electron donor has the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and
the second external electron donor has the formula $R^3{}_n Si(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor.

E18. The method of any of the above embodiments, wherein the non-aromatic internal electron donor comprises an aliphatic amine, amide, ester, ether, ketone, nitrile, phosphine, phosphoramide, thioether, thioester, aldehyde, alcoholate, carboxylic acid, or a combination thereof.

E19. The method of any of the above embodiments, wherein the non-aromatic internal electron donor comprises a $C_1$ to $C_{20}$ diester of a substituted or unsubstituted $C_2$ to $C_{10}$ dicarboxylic acid.

E20. The method of any of the above embodiments, wherein the non-aromatic internal electron donor is a succinate according to the formula:

wherein $R^1$ and $R^2$ are, independently, $C_1$ to $C_{20}$ linear or branched alkyl, alkenyl, or cycloalkyl hydrocarbyl radicals;
$R^3$ to $R^6$ are, independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, or wherein at least two of the $R^3$ to $R^6$ radicals are joined to form a cyclic divalent radical, or a combination thereof.

E21. The method of any of the above embodiments, wherein the first external electron donor and the second external electron donor are selected from the group consisting of tetraethoxysilane, methylcyclohexyldimethoxysilane, propyltriethoxysilane, dicyclopentyldimethoxysilane, and combinations thereof.

E22. The method of any of the above embodiments, wherein the Ziegler-Natta catalyst system comprises a titanium-based Ziegler-Natta catalyst on a magnesium support.

E23. The method of any of the above embodiments, wherein the Ziegler-Natta catalyst system further comprises an organoaluminum Ziegler-Natta co-catalyst.

E24. The method of any of the above embodiments, wherein the Ziegler-Natta catalyst system comprises 2.5 mol % to less than 50 mol % of the first electron donor based on total mol % of external electron donors wherein the first electron donor comprises dicyclopentyldimethoxysilane (DCPMS) and greater than 50 mol % of a second electron donor based on total mol % of electron donors wherein the second electron donor comprises propyltriethoxysilane (PTES).

E25. The method of any of the above embodiments, wherein a relationship between the first external electron donor and the second external electron donor is defined by the equation:

1.2≤log [MFR(b)/MFR(a)]≤1.4 wherein MFR(a) is a first melt flow rate of a homopolymer formed by polymerizing propylene monomers in the presence of the Ziegler-Natta catalyst and the first external electron donor, and wherein MFR(b) is a second melt flow rate of a homopolymer formed by polymerizing propylene monomers in the presence of the Ziegler-Natta catalyst and the second external electron donor, and wherein the MFR(a) is lower than the MFR(b).

E26. The method of any of the above embodiments, wherein the resin produced is according to any one of embodiments E1-E15.

EXAMPLES

The following ASTM test methods in Table 1 and described below were utilized for the physical property measurements.

TABLE 1

Test Methods

| PROPERTY | ASTM METHOD |
| --- | --- |
| Melt Flow Rate (g/10 min) | D 1238, Condition L |
| 1% Secant Flexural Modulus, MPa (psi) | D 790 A |
| Tensile strength at Yield, MPa (psi) | D 638 |
| Elongation at Yield (%) | D 638 |
| Elongation at Break (%) | D 638 |
| Notched Izod Impact Strength J/m (ft-lbs/in) | D 256 |
| Heat Distortion Temperature (HDT) @ 66 psi load (° C.) | D 648 |
| Rockwell Hardness, R-Scale | D 785 |
| Gloss at 60° | D 523 |

Melt Flow Rate (MFR): MFR is measured as per ASTM D1238, condition L, at 230° C. and 2.16 kg load using a melt indexer.

Flexural Modulus: The Flexural Modulus is measured according to ASTM D790A, using a crosshead speed of 1.27 mm/min (0.05 in/min), and a support span of 50.8 mm (2.0 in) using an Instron Machine.

Tensile Strength: The Tensile Strength at yield, elongation at yield and elongation at break were measured as per ASTM D 638, with a crosshead speed of 50.8 mm/min (2.0 in/min), and a gauge length of 50.8 mm (2.0 in), using an Instron Machine.

Notched Izod Impact Strength: The Notched Izod Impact Strength is measured as per ASTM D256 at room temperature (21° C.), using an equipment made by Empire Technologies Inc.

Heat Distortion Temperature (HDT): The HDT is measured according to ASTM D648, using a load of 0.45 MPa (66 psi).

Polydispersity Index (PI): The Polydispersity Index is obtained from oscillatory shear data, from the cross-over modulus and frequency as measured at 190° C. as described in Zeichner G R, Patel P D (1981), "A Comprehensive study of polypropylene melt rheology"; Proceedings of the 2nd World Congress of Chemical Engineering, Montreal, Canada.

Polymerization of Example 1

Example 1 was produced in a pilot plant conditions, in a continuous stirred tank reactor (CSTR). The magnesium chloride supported titanium catalyst sold commercially as Avant ZN-168M is utilized with an external donor blend of propyltriethoxysilane and dicyclopentyldimethoxysilane. The catalyst composition preparation is carried out continuously in situ by contacting the catalyst solids, triethylaluminum, and the external electron donor system under the conditions known in the art to yield active, stereospecific catalyst for polymerization of propylene. The activated catalyst was continuously fed to a prepolymerization reactor where it was polymerized in propylene to a productivity of approximately 100 to 300 g-polymer/g-cat. The prepolymerized catalyst was then continuously fed to a continuously stirred tank reactor and polymerization continued at a reactor temperature of 70° C. to yield homopolymer. The hydrogen (chain transfer agent) concentration used in the reactor as show in Table 2. The reactor slurry was continuously removed from the polymerization reactor and the homopolymer granules are continuously separated from the liquid propylene. The granules were passed through a dryer to remove the residual monomer and collected in Gaylord boxes. Examples 2-7 were produced in the same way with varying hydrogen levels in the reactor to achieve the desired melt flow rate (MFR).

The homopolymer granules from the reactor were stabilized with 0.090 wt % Irganox™ 1010, 0.045 wt % Ultranox™ 626A, and 0.10 wt % sodium benzoate (fine form), and pelletized on a twin screw extruder (Werner Pfliederer 30 mm) The pellets were then injection molded using ASTM test specimens and the physical properties tested as per ASTM guidelines.

TABLE 2

Data on polypropylene homopolymers.

| Property | Example 1 | Example 2 | Example 3 | Example 4 | Example 5 | Example 6 | Example 7 |
| --- | --- | --- | --- | --- | --- | --- | --- |
| MFR (g/10 min) | 0.9 | 1.0 | 1.4 | 11.7 | 15.6 | 37.8 | 63.4 |
| MWD (PI[1]) | 7.6 | 7.8 | 8.3 | 8.3 | 8.3 | 8.2 | — |
| Tensile at Yield MPa (psi) | 40 (5858) | 39 (5718) | 41 (5893) | 42 (6111) | 43 (6185) | 43 (6200) | 41 (5942) |
| 1% Sec Flex Modulus MPa (kpsi) | 2200 (319) | 2048 (297) | 2276 (330) | 2386 (346) | 2413 (350) | 2428 (352) | 2407 (349) |
| HDT (° C.) | 124 | 125 | 125 | 128 | 127 | 128 | 128 |
| Room Temp. Notched Izod J/m (ft-lbs/in) | 16 (0.3) | 21 (0.4) | 16 (0.3) | 21 (0.4) | 16 (0.3) | 11 (0.2) | 11 (0.2) |
| Rockwell Hardness | 113 | 112 | 113 | 115 | 115 | 116 | 116 |

TABLE 2-continued

Data on polypropylene homopolymers.

| Property | Example 1 | Example 2 | Example 3 | Example 4 | Example 5 | Example 6 | Example 7 |
|---|---|---|---|---|---|---|---|
| Gloss at 60° | 90 | 90 | 90 | 89 | 89 | 89 | 88 |
| Melt Strength (cN) | 43[3] | 52[3]/81 | 30[3] | — | — | — | — |
| Viscosity Ratio[2] | 66 | 41 | 59 | 15 | 20 | 14 | — |

PI: Polydispersity Index
Viscosity ratio - complex viscosity ratio at 0.01/100 angular frequency rad/sec.
Non-optimized addpack Comparative Example 1 is Borealis Daploy™ WB135HMS, a commercial grade-post reactor grafted polypropylene. Comparative Example 2 is a commercial grade polymer made with methylcyclohexyl dimethoxy silane (MCMS) external donor and a commercial Ziegler-Natta catalyst solids THC-C series supplied by Toho Titanium Co., Comparative Example 3 is exemplary of the polymer produced according to U.S. Pat. No. 6,087,459, made under pilot plant conditions to provide a direct comparison of the polymers produced according to the '459 patent to the instant disclosure. The data is shown in Table 3.

TABLE 3

Comparative Examples.

| Property | Comparative Example 1 | Comparative Example 2 | Comparative Example 3 |
|---|---|---|---|
| MFR (g/10 min) | 2.5 | 2.1 | 35 |
| MWD (PI[1]) | — | 4.2 | 5.0 |
| Tensile at Yield MPa (psi) | 48 (6918) | 38 (5530) | 41 (5965) |
| 1% Sec Flex Modulus MPa (kpsi) | 1986 (288) | 1903 (276) | 2069 (300) |
| HDT (° C.) | — | 122 | — |
| Room Temp. Notched Izod J/m (ft-lbs/in) | — | 52 (0.99) | 22 (0.41) |
| Rockwell Hardness | — | — | — |
| Gloss at 60° | — | — | — |
| Melt Strength (cN) | 29 | 5 | 1.0 |
| Viscosity Ratio[2] | 62 | 15-20 | — |

PI: Polydispersity Index
Viscosity ratio - complex viscosity ratio at 0.01/100 angular frequency rad/sec.

Figure 1:
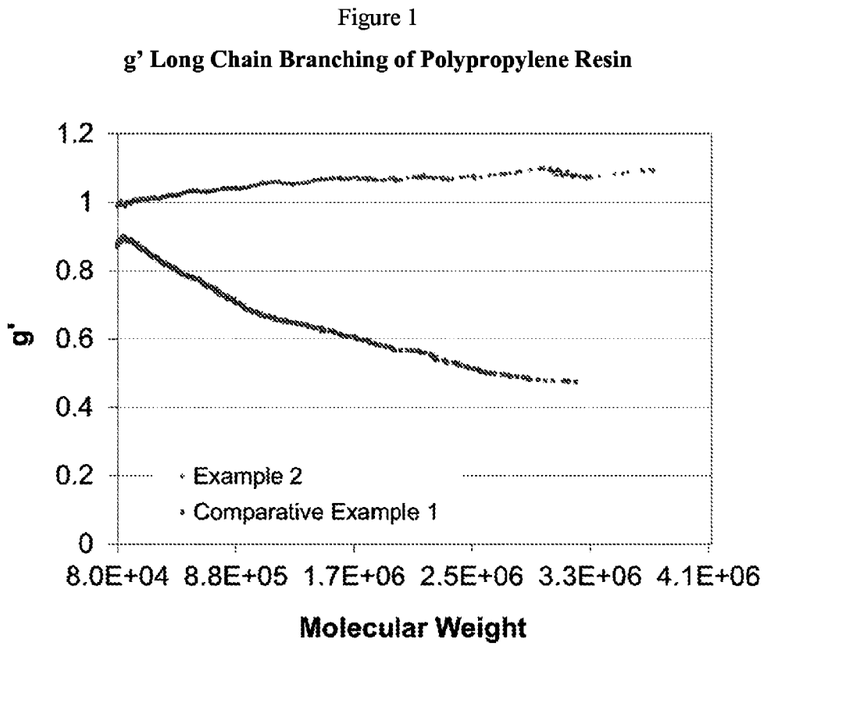
FIG. 1 is a graph plotting the intrinsic viscosity vs. molecular weight of a propylene resin produced according to the instant disclosure.

FIG. 1 shows the branching index g' of Example 2, indicating no evidence of long chain branching. As is known to one of skill in the art, long chain branched polymers have a branching index g' which decreases significantly lower than 1, yet as is shown in FIG. 1, the g' value remains close to 1.

The branching index ($g'_{vis}$, also referred to herein as g') is calculated using the output of the SEC-DRI-LS-VIS method (described in page 37 of U.S. Pat. No. 7,807,769 for g') as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'_{vis} = \frac{[\eta]_{avg}}{kM_v^\alpha}.$$

Figure 2:
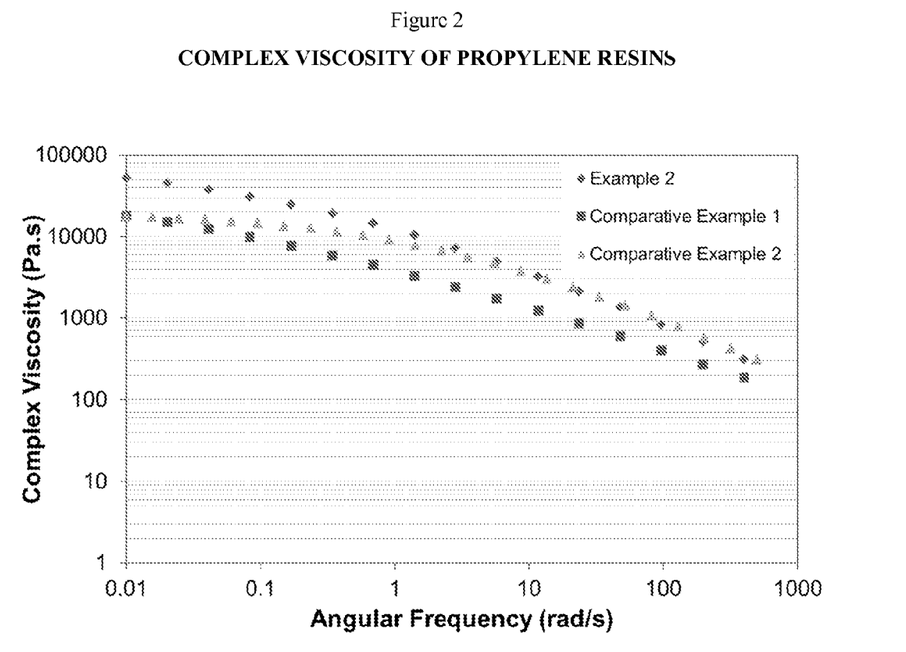
FIG. 2 shows a plot of the complex viscosity vs. the angular frequency of a propylene resin produced according to the instant disclosure.

FIG. 2 shows the complex viscosity vs. angular frequency for Example 2 in comparison to Comparative Examples 1 and 2. All shear/viscosity rheological experiments were conducted with an Anton Paar MCR500 Rheometer equipped with a 25 mm diameter parallel-plate fixture. Disk samples were prepared by compression molding to a thickness of 2.5 mm and diameter of 25 mm. The gap between the two parallel plates was maintained at 1.90 mm for all measurements. Small-amplitude oscillatory shear tests were performed as a function of angular frequency ([omega]) ranging from 0.01 to 500 rad/s at 190° C. A fixed strain of 10% was used to ensure that measurements were carried out within the linear viscoelastic range of the materials investigated.

We claim:

1. A polypropylene resin, comprising:
   at least 50 mol % propylene;
   an MWD (Mw/Mn) greater than 5;
   a branching index (g') of at least 0.95; and
   a melt strength greater than 20 cN determined using an extensional rheometer at 190° C.;
   wherein the resin is produced by contacting propylene monomers at propylene polymerization conditions with a catalyst system comprising a Ziegler-Natta catalyst comprising a non-aromatic internal electron donor, and first and second external electron donors comprising different organosilicon compounds.

2. The resin of claim 1, wherein the MWD is from 6 to 15.

3. The resin of claim 1, wherein the melt strength is from 50 cN to 200 cN.

4. The resin of claim 1, comprising a viscosity ratio of from 35 to 80 determined from the complex viscosity ratio at 0.01 to 100 rad/s angular frequency at a fixed strain of 10% at 190° C.

5. The resin of claim 1, having a heat distortion temperature of greater than or equal to 100° C., determined according to ASTM D648 using a load of 0.45 MPa (66 psi).

6. The resin of claim 1, wherein the resin is an impact copolymer.

7. The resin of claim 1, the resin comprises at least 99 mol % propylene.

8. The resin of claim 1, wherein the resin comprises from 0.1 to 10 mol % of a comonomer selected from the group consisting of ethylene and $C_4$ to $C_{20}$ olefins.

9. The resin of claim 1, having an isopentad percentage of greater than 95%.

10. The resin of claim 1, having an MFR from 0.1 to 100, determined according to ASTM D1238 Condition L.

11. The resin of claim 1, comprising a stiffness of from 2000 MPa (290 kpsi) to 2500 MPa (360 kpsi) determined according to ASTM D790A on nucleated samples with 0.1% sodium benzoate.

12. The resin of claim 1, further comprising greater than or equal to 0.01 wt % of one or more fillers; antioxidants; anti-cling agents; tackifiers; UV stabilizers; heat stabilizers;

anti-blocking agents; release agents; anti-static agents; pigments; colorants; dyes; waxes; silica; talc; or a combination thereof.

13. The resin of claim 1, wherein the resin is free of functionalized polypropylene or comprises less than 5 wt % of functional groups selected from hydroxide, aryls, substituted aryls, halogens, alkoxys, carboxylates, esters, acrylates, and carboxyl, based upon the weight of the polypropylene resin, and wherein the number of carbons of the polypropylene resin involved in olefinic bonds is less than 5% of the total number of carbon atoms in the resin.

14. The resin of claim 1, wherein the resin is free of post-reactor grafted polypropylene or comprises less than 5 percent by weight of post-reactor grafted polypropylene.

* * * * *